US009268341B2

(12) United States Patent
Da Silva et al.

(10) Patent No.: US 9,268,341 B2
(45) Date of Patent: Feb. 23, 2016

(54) THERMOSTATIC CARTRIDGE FOR THE REGULATION OF HOT AND COLD FLUIDS TO BE MIXED

(71) Applicant: VERNET, Ollainville (FR)

(72) Inventors: William Da Silva, Ollainville (FR); Emmanuel Platet, Lardy (FR)

(73) Assignee: VERNET, Ollainville (FR)

( * ) Notice: Subject to any disclaimer, the term of this patent is extended or adjusted under 35 U.S.C. 154(b) by 92 days.

(21) Appl. No.: 13/824,961

(22) PCT Filed: Dec. 6, 2012

(86) PCT No.: PCT/EP2012/074663
§ 371 (c)(1),
(2) Date: Mar. 18, 2013

(87) PCT Pub. No.: WO2013/083704
PCT Pub. Date: Jun. 13, 2013

(65) Prior Publication Data
US 2014/0361091 A1 Dec. 11, 2014

(30) Foreign Application Priority Data

Dec. 7, 2011 (FR) ..................................... 11 61288

(51) Int. Cl.
G05D 23/13 (2006.01)
(52) U.S. Cl.
CPC .......... G05D 23/134 (2013.01); G05D 23/1346 (2013.01)
(58) Field of Classification Search
CPC .............. G05D 23/132; G05D 23/134; G05D 23/1346; G05D 23/1856; G05D 23/1858
USPC ................................. 236/12.11, 12.19, 12.21
See application file for complete search history.

(56) References Cited

U.S. PATENT DOCUMENTS 8,899,491 B2 * 12/2014 Knapp ............... G05D 23/1353
236/100
2004/0089728 A1 5/2004 Nember
2014/0124586 A1 * 5/2014 Da Silva ................ G05D 23/01
236/93 R

FOREIGN PATENT DOCUMENTS

| CN | 1038867 | 1/1990 |
|---|---|---|
| EP | 0 187 378 A2 | 7/1986 |
| EP | 1 496 415 A2 | 1/2005 |
| FR | 2 869 087 A1 | 10/2005 |
| FR | 2 921 709 A1 | 4/2009 |
| WO | WO 89/12147 | 12/1989 |

OTHER PUBLICATIONS

French Preliminary Search Report dated Jul. 13, 2012 for French Application No. FR 1161288.

* cited by examiner

Primary Examiner — Marc Norman
(74) Attorney, Agent, or Firm — Knobbe, Martens, Olson & Bear, LLP

(57) ABSTRACT

The cartridge comprises a slide valve for regulating the temperature of a mixture of hot and cold fluids. The slide valve is, under the action of a thermostatic element and in relation to an outer casing of the cartridge, which can be displaced along the central axis of the casing in such a way as to vary inversely the respective flow sections of an inlet for a first of the fluids, delimited axially between the casing and one of the two opposite axial surfaces of the slide valve, and of an inlet for the second fluid, delimited axially between the casing and the other axial surface of the slide valve. Therefore the cartridge can, effectively and economically, provide a good mixture of the two fluids, a flow passage.

10 Claims, 3 Drawing Sheets

THERMOSTATIC CARTRIDGE FOR THE REGULATION OF HOT AND COLD FLUIDS TO BE MIXED

CROSS REFERENCE TO RELATED APPLICATIONS

This application is the U.S. National Phase of International Application No. PCT/EP2012/074663, filed Dec. 6, 2012, designating the U.S. which claims the benefit of French Patent Application No. 11 61288 filed Dec. 7, 2011.

FIELD OF THE INVENTION

The invention relates to a thermostatic cartridge for the regulation of hot and cold fluids to be mixed, in particular hot water and cold water in a sanitary installation.

BACKGROUND OF THE INVENTION

In this type of cartridge, thermostatic regulation is generally obtained by means of an expandable thermostatic element comprising, on the one hand, a piston normally fixed in relation to the outer hollow casing of the cartridge and, on the other hand, a body integral with a slide valve for regulation. This slide valve can be displaced in relation to the casing of the cartridge in such a way as to vary inversely the flow sections of the two fluids, referred to as "hot fluid" and "cold fluid", supplying the cartridge with the purpose of mixing these fluids in variable proportions in order to obtain, downstream of the slide valve, a fluid, referred to as "mixed fluid", which flows along a thermosensitive part of the thermostatic element and which exits the cartridge. By changing the position of the piston in relation to the casing, generally by means of an ad hoc adjusting mechanism, the thermostatic regulation temperature is fixed, i.e. the balancing temperature around the temperature of the mixed fluid is adjusted. An example of this type of cartridge is provided by EP-A-1 496 415 whereon is based the preamble of the annexed claim 1.

In order to improve the quality and/or the rapidity of the thermostatic regulation, it is known to provide this type of cartridge with a fixed member for creating turbulence, commonly referred to as a "turbulator": this member disturbs the flow of the mixture around the thermosensitive part of the thermostatic element, in such a way as to increase the turbulence of this mixture in order to homogenize the latter and as such even out its temperature. However, the presence of this turbulator limits the abilities of evacuating the mixture at the outlet of the cartridge and therefore imposes a imitation of the maximum output flow of the cartridge. In addition, the presence of this turbulator does not prevent, and even accentuates the risk that one of the two fluids, which is not supposed to flow through the slide valve since it is admitted on the side of the slide valve turned towards the outlet, begins to "work back up" in the slide valve, thus disturbing the flow of the other fluid through the slide valve: this situation generally results in that the two fluids flow from the slide valve, in the direction of the outlet, in the form of two concentric columns, with the thermosensitive part of the thermostatic element being substantially subjected only to the flow of the inner column.

SUMMARY OF INVENTION

The purpose of this invention is to propose a thermostatic cartridge that provides, effectively and economically, a better mixture of the hot and cold fluids to be adjusted.

To this end, the invention has for purpose a thermostatic cartridge for the regulation of mixed hot and cold fluids.

One of the ideas at the basis of the invention is to seek to constrain the fluid, having to pass through the slide valve, to break the flow of the other fluid as soon as the latter is admitted inside the casing of the cartridge. To do this, the flow passage of the first fluid through the slide valve is designed, through the arrangement of shapes consisting both of a guiding surface, running over substantially the entire inside periphery of the slide valve, and of an opposite surface, having the same profile as the aforementioned guiding surface, to force the first fluid, when it exits the slide valve, to be directed on the second fluid inlet. Of course, this guiding of the first fluid is carried out by the slide valve inside the casing of the cartridge, in such a way that this first fluid is as such directed, according to the invention, on the downstream side of the second fluid inlet. In this way, the flow of the first fluid, immediately downstream of the slide valve, reaches the flow of the second fluid, immediately downstream of the inlet of the second fluid, with respective directions for the flow of the first fluid and for the flow of the second fluid which in general oppose each other, in that where this flow and that flow are directed directly onto each other, in practice in an inclined manner in relation to one another. The mixture of the two fluids is then rapidly homogenised, with and evening out of the temperature of the mixture obtained. In addition, the second fluid is, under the action of the first fluid directed on the second fluid inlet, prevented from rising back up in the flow passage of the slide valve.

Additional advantageous characteristics of the cartridge in accordance with the invention, taken separately or according with all combinations technically permissible.

BRIEF DESCRIPTION OF THE DRAWINGS

The invention shall be better understood when reading the following description, provided solely by way of example and in reference to the drawings wherein.

DETAILED DESCRIPTION OF THE EMBODIMENTS

Figure 1:
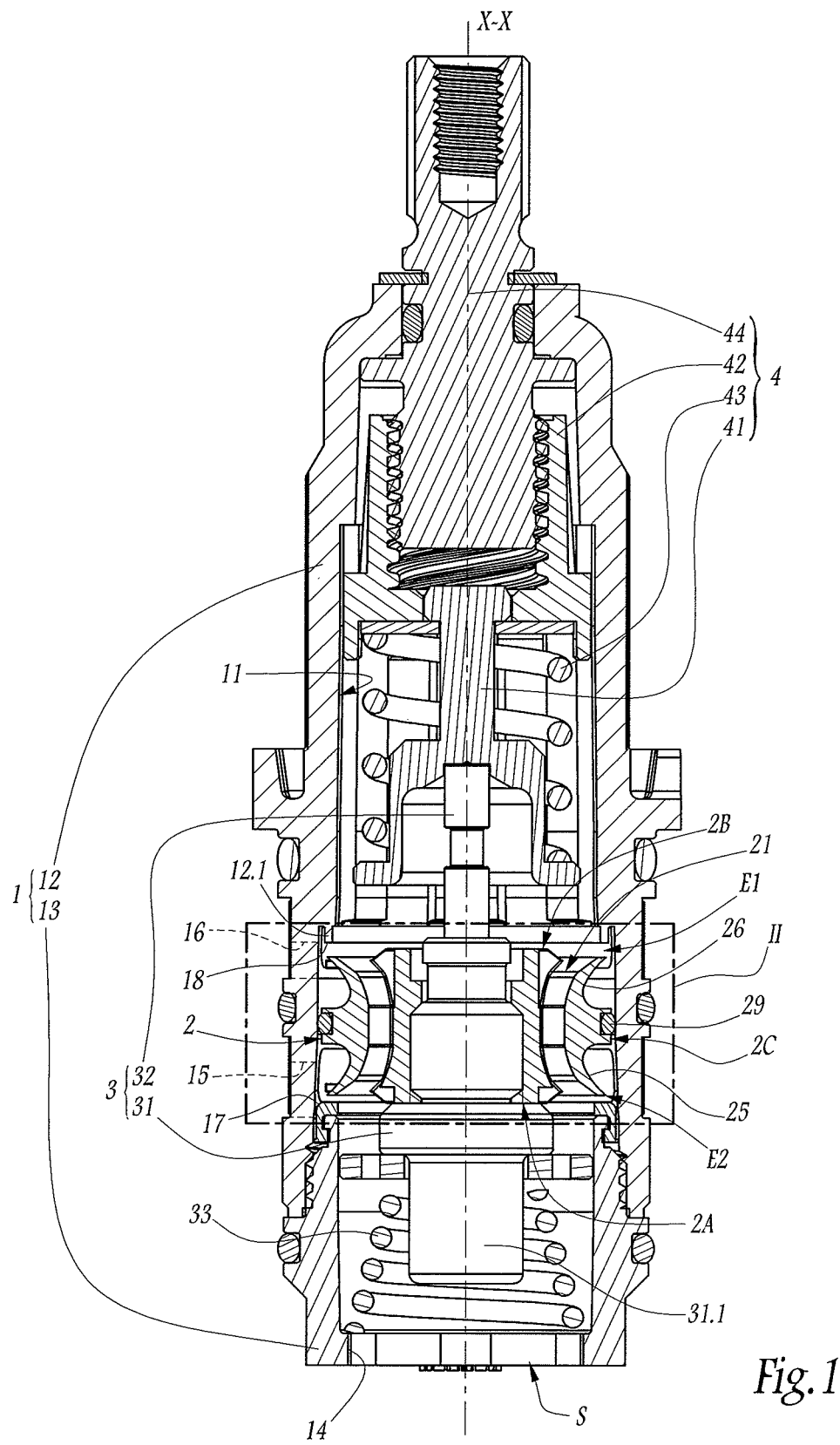
FIG. 1 is a diagrammatical longitudinal cross-section of a cartridge according to the invention.
Figure 2:
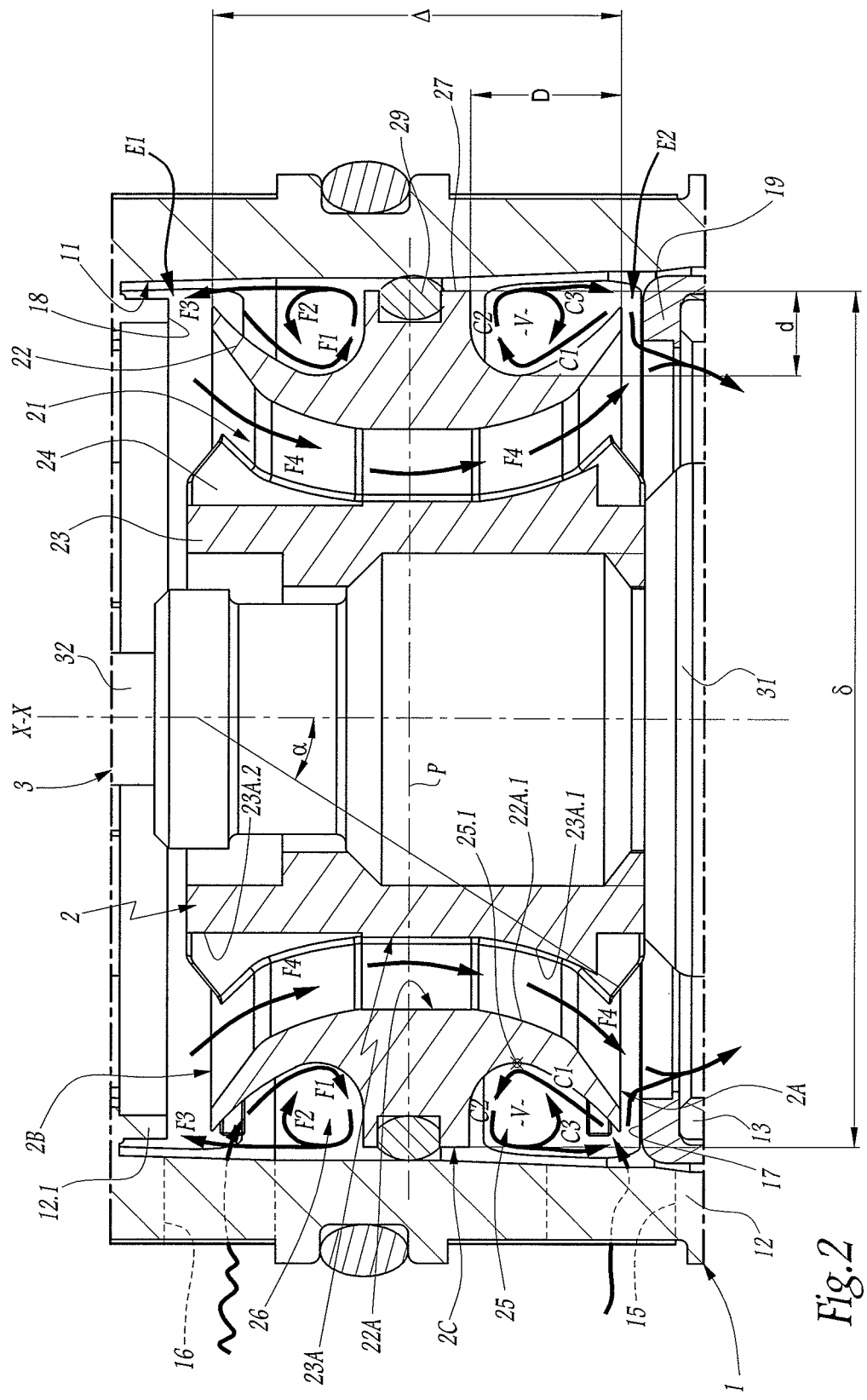
FIG. 2 is a view on a larger scale of the framed zone II of FIG. 1.

FIGS. 1 and 2 show a thermostatic cartridge arranged around and along a central axis X-X. This cartridge is adapted in order to equip a mixer tap for hot water and cold water, not shown as such in the figures, or, more generally, in order to equip a sanitary installation.

The cartridge comprises, as a main external component, an outer hollow casing 1. This casing 1 has a generally tubular shape, which is centred on the axis X-X and which interiorly delimits a central longitudinal channel 11.

For convenience, the rest of the description is orientated in relation to the axis X-X, in that wherein the terms "upper" and "top" correspond to an axial orientation turned towards the top portion of FIGS. 1 and 2, while the terms "lower" and "bottom" correspond to an axial direction in the opposite direction.

The casing 1 comprises an upper case 12 at the lower end of which a socket 13 is screwed. The inner channel 11 extends both along the case 12 and the socket 13 and exits at the bottom on the exterior, through an opening 14 of the socket, which, in the example embodiment considered in the figures, is centred on the axis X-X. The case 12 and the socket 13 are intended to be mounted in a sealed manner in the body of the aforementioned mixer tap, with interposition of O-rings, which can be seen in FIG. 1. Note that, in the example embodiment considered in the figures, the case 12 is of a single piece, with the understanding that, in an alternative not shown, this case can be constituted of several parties made fixedly integral to each other by any suitable means, in the same way that the socket 13 is fixedly integral with the case 12.

The wall of the case 12 has lateral passages 15 and 16 passing through this wall from one end to the other in order to connect the exterior of the casing 1 to the inner channel 11. The passage 15 is axially offset along the case 12 in relation to passage 16. In practice, each of the lateral passages 15 and 16 are presented in a non-restrictive form of this invention: by way of example, each of the passages 15 and 16 can be in the shape of a circular hole, passing radially from one end to the other through the wall of the case 12; or each of these passages 15 and 16 include one or several through-holes, extending as arcs of a circumference centred on the axis X-X; or further each of these passages 15 and 16 extends, at least partially, axially in the thickness of the wall of the case 12, exiting at the exterior of this wall, via one or several orifices of various geometries, at an axial level that is different from that where exits the passage inside the case 12, also via one or several orifices of various geometries.

In any case, the lower passage 15 constitutes an arrival of hot water, while the upper passage 16 constitutes an arrival of cold water.

The cartridge further comprises a slide valve 2 mounted in a mobile manner along the axis X-X between two end positions, i.e.:

a bottom end position, wherein the lower axial surface 2A of the slide valve 2 is pressing against an annular seat 17, which is carried fixedly by the casing 1 and which is located, along the axis X-X, substantially at the exit of the passage 15 inside the case 12, and a top end position, wherein the upper axial surface 2B of the slide valve 2 is pressing against an annular seat 18, which is carried fixedly by the casing 1 and which is located, along the axis X-X, substantially at the exit of the passage 16 inside the case 12.

In practice, in the example embodiment considered in the figures, the lower seat 17 is formed by the edge of the upper end of a seal 19 fixedly added to the upper end of the socket 13, while the upper seat 18 is formed by the edge of the lower end of a shouldered portion 12.1 of the case 12.

Insofar as the total axial dimension of the slide valve 2, separating its opposite surfaces 2A and 2B from each other and noted as Δ in FIG. 2, is lower than the axial distance separating the seats 17 and 18 from each other, it is understood that, when the slide valve 2 is in its bottom end position, the slide valve seals off the inlet of hot water inside the seat 17, while fully opening a cold water inlet E1, which is delimited axially between the upper surface 2B of the slide valve 2 and the seat 18. Inversely, when the slide valve 2 is in its top end position, the slide valve seals of the inlet of cold water inside the seat 18, while fully opening a hot water inlet E2 which is delimited axially between the lower surface 2A of the slide valve 2 and the seat 17. Of course, according to the arrangement of the slide valve 2 along the axis X-X between these top and bottom end positions, the respective flow sections of the cold water inlet E1 and of the hot water inlet E2 vary inversely, which amounts to saying that the quantities of cold water and of hot water admitted inside the seats 17 and 18 are regulated, in respective inverse proportions, by the slide valve 2 according to its axial position. In FIGS. 1 and 2, the slide valve 2 occupies an intermediate position between its top and bottom end positions.

The slide valve is mounted mobile in the case 12, in such a way that its lateral outer surface 2C is received in a substantially adjusted manner in the portion of the inner channel 11, on either side of which are located the passages of the arrival of hot water 15 and of cold water 16. A peripheral seal 29, radially interposed between the lateral outer surface 2C of the slide valve and the inner surface of the aforementioned portion of the channel 11, sealed in relation to one another the passages 15 and 16 to the exterior of the slide valve 2. So that the cold water admitted inside the seat 18 can join and mix with the hot water admitted inside the seat 17, thus forming a mixture of flowing cold water and hot water, downstream of the slide valve, until the opening 14 which constitutes an exit S for this mixture, the slide valve 2 interiorly delimits a flow passage 21 connecting the opposite surfaces 2A and 2B together. Details on this flow passage 21, as well as other characteristics of the slide valve 2 shall be provided further on.

In order to drive in displacement the slide valve 2 and as such control its axial position, the cartridge comprises a thermostatic element 3 of which the body 31, centred on the axis X-X, is fixedly integral with the slide valve 2. This body 31 contains a heat expandable material which, under the action of the heat of the mixture between the hot water and the cold water, flowing downstream of the slide valve 2 along a thermosensitive part 31.1 of the body 31, expands and causes the relative displacement, in translation along the axis X-X, of a piston 32 of the thermostatic element 3, centred on the axis X-X. The end portion of the piston 32, opposite the body 31, is connected to the casing 1 by a mechanical unit 4, known per se and able to adjust the axial altitude of the piston 32 in relation to the casing 1, independently of the relative position of the body 31.

In the example embodiment considered in the figures, the end of the piston 32, opposite the body 31, is pressed against a stop 41 mounted slidingly, along the axis X-X, inside a nut 42, with interaxial position of an overtravel spring 43. The axial position of the nut 42 inside the casing 1, and thereby the altitude of the piston stop 41, can be modified by an adjustment screw 44, which is centred on the axis X-X and of which the upper end is grooved in such a way as to be able to be connected in rotation with a maneuvering control, not shown in the figures. At its lower end, this adjustment screw 44 is screwed into the nut 42, with the latter being connected in rotation around the axis X-X to the case 12, typically via grooves. As such, when the screw 44 is driven in rotation on itself around the axis X-X, the nut 42 translates according to this axis, which causes the corresponding driving of the stop 41 by the intermediary of the spring 43. In addition, the thermostatic element 3 is associated to a return spring 33, which acts on the slide valve 2 in a manner opposite the deployment of the piston 32 in relation to the body 31 of the thermostatic element and which is axially interposed between this slide valve and the lower socket 13 of the casing 1.

The structure and the operation of the mechanical unit 4 will not be described any further here, with the understanding that the reader can, to this end, refer to FR-A-2 869 087 in the name of the same Applicant as herein. Recall that the form of the embodiment of this mechanism 4 does not limit the invention: other forms of embodiment are known in the art, for example in FR-2 921 709, FR-2 774 740 and FR-2 870 611. Moreover, in terms of an alternative not shown, if being able to adjust the value of the temperature at which the slide valve adjusts the mixture of the hot water and of the cold water is renounced, the unit 4 can be suppressed from the cartridge, with the piston 32 then being fixedly connected to the casing 1.

Figure 3:
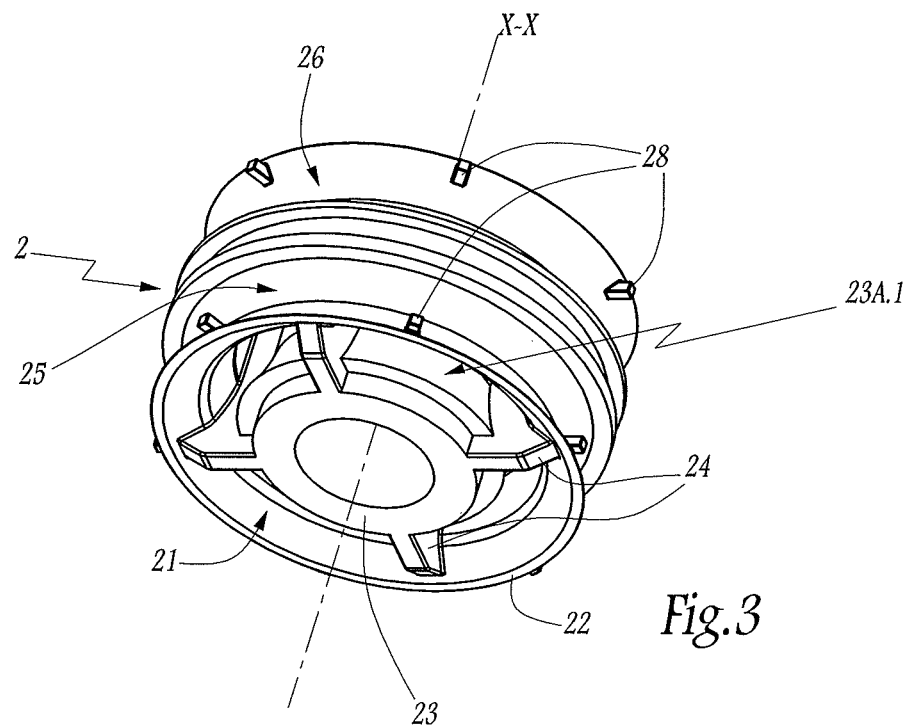
FIGS. 3 and 4 are perspective views, under different angles, of the slide valve, shown alone, belonging to the cartridge of FIG. 1.
Figure 4:
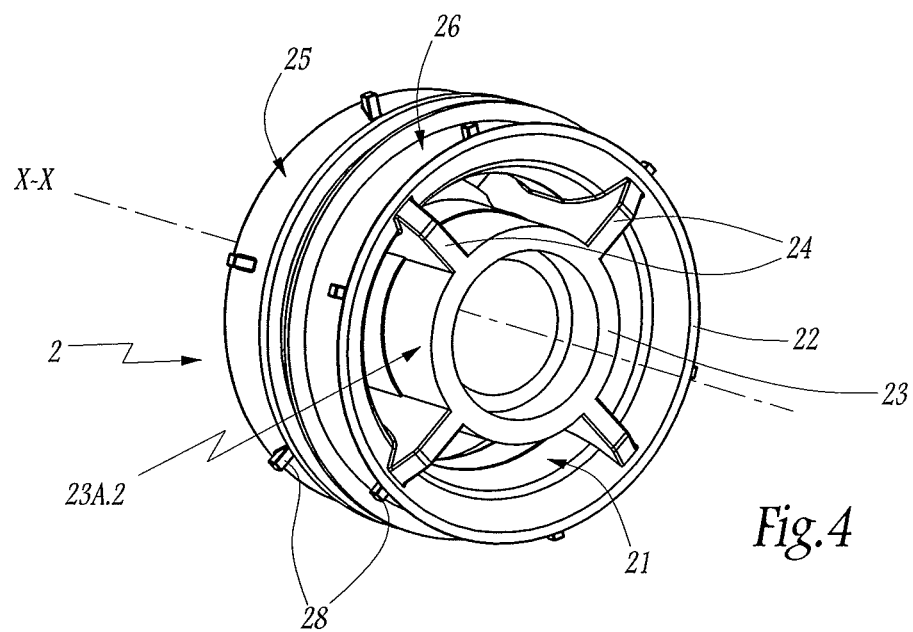

Returning now to the detailed description of the slide valve 2, note that, as can be seen easily in FIGS. 2 to 4, the body of this slide valve comprises two generally annular portions, which are concentric as being centred on the axis X-X, with the portion of the external body referenced as 22 while the portion of the internal body is referenced as 23. The portions of body 22 and 23 radially delimit between them the aforementioned flow passage 21, noting that arms or ribs 24, which are distributed around the axis X-X and which are of a number of four in the example of the figures, each extend radially between the portions of body 22 and 23 and as such fixedly connecting them together: this results in that the flow passage 21 is jointly constituted of the four free spaces separating the arms 24 two-by-two according to the periphery of the slide valve. Advantageously, as in the example embodiment considered in the figures, the portion of the external body 22, the portion of the internal body 23 and the arms 24 are integral with each other, constituting as such as a single piece the slide valve 2, with the latter for example obtained via moulding.

The respective upper end edges of the portions of body 22 and 23 belong to the surface 2B of the slide valve 2, while the respective lower end edges of these portions of body 22 and 23 belong to the surface 2A of the slide valve. The lateral outer surface 2C of the slide valve is substantially constituted of the lateral surface of the portion of the body 22, which is radially opposite the portion of the body 23. The lateral surface of the portion of the body 23, which is radially opposite the portion of body 22, is arranged in order to receive the thermostatic element, in particular in order to render it integral with the body 31 of the latter, in particular via screwing.

Now taking further interest in the exterior arrangements of the slide valve 2, note that the portion of external body 22 delimits exteriorly two grooves, respectively lower 25 and upper 26. The grooves 25 and 26 are separated axially from one another by a running part 27 which belongs to the lateral outer surface 2C of the slide valve 2, extending on either side of a transverse median plane P of the slide valve 2, which is perpendicular to the axis X-X. This running part 27 is exteriorly provided with the seal 29, forming, substantially in the plane P, a peripheral seal line in relation to the case 12. In the example embodiment considered here, these exterior grooves 25 and 26 are substantially symmetrical with one another in relation to the transverse median plane P of the slide valve 2: in these conditions, the lower groove 25 shall be described in detail hereinafter, with the understanding that the same description applies to the upper groove 26, by inverting the top and bottom or similar qualifications.

As such, the groove 25 runs over the entire outside periphery of the portion of the body 22 of the slide valve 2. This groove 25 exits both onto the lateral surface 2C and onto the lower surface 2A of the slide valve. More precisely, as can be seen easily in FIGS. 2 and 3, the groove 25 radially exits onto the lower end portion of the lateral surface 2C. In addition, the groove 25 axially exits onto the outside periphery of the lower axial surface 2A.

In the embodiment considered here, the groove 25 has, as an axial cross-section as in FIG. 2, a concave profile, which is substantially constant over the entire periphery of the portion of body 22 and which connects the lateral outer surface 2C to the lower axial surface 2A of the slide valve 2, passing through a bottom 25.1 of the groove 25, which constitutes the peripheral zone of the groove that is the closest radially to the axis X-X. Advantageously, for reasons which will appear further on, the concave profile of the groove 25 is more expanded on the side of the lower axial surface 2A of the slide valve 2: more precisely, the upper portion of the concave profile, connecting the bottom 25.1 to the lateral outer surface 2C, has a lesser axial dimension and a local curvature that is more marked than the portion of the lower profile, connecting the bottom 25.1 to the lower surface 2A.

In terms of advantageous dimensioning, of which the interest shall appear further on, note that the axial dimension, denoted as D in FIG. 2, of the opening of the groove 25 onto the lateral surface 2C is provided large with regards to the total axial mid-size dimension of the slide valve 2: as such, this axial dimension D is advantageously at least 40% of the total axial dimension Δ of the slide valve. In addition, the radial depth of the bottom 25.1, in other words the maximum radial dimension of the groove 25 with regards to the lateral surface 2C, which is denoted as d in FIG. 2, is at least 5% of the maximum transverse dimension of the slide valve 2, in other words at least 5% of the outer diameter of the slide valve.

When the cartridge is in service, the hot water arriving via the passage 15 is channeled by the groove 25 when it reaches the outside periphery of the slide valve 2, as indicated on the arrows C1 in FIG. 2. As such, this hot water fills the free volume V of the groove 25, i.e. its free volume delimited in the thickness of the portion of the external body 22 of the slide valve 2, and circulates in the groove 25 all around the slide valve 2. The concave profile of the gorge facilitates this filling, by forcing most of the hot water to join and to swirl towards the bottom 25.1 of the groove 25, as indicated by the arrows C2 in FIG. 2. With the condition that the hot water inlet E2 is not closed by the slide valve 2 pressing against the seat 17, hot water, coming from the groove 25, then supplies the inlet E2 over the entire outside periphery of the slide valve 2, as indicated by the arrows C3 in FIG. 2. It is understood that, at any point of the outside periphery of the slide valve 2, the supply of hot water of the inlet E2 par the groove 25 is effective and homogeneous: as such, thanks to the fact that, over the entire outside periphery of the slide valve, in other words radially opposite the passage 15 as well as outside of this passage according to the periphery of the case 12, the groove 25 supplies the inlet E2 with a constant quantity of hot water, it is possible to admit inside the seat 17 as much hot water as is possible, for a given axial position of the slide valve 2.

Advantageously, the groove 25 is provided as such to supply the inlet E2 with a sufficient amount of hot water in order to saturate it when a sufficient flow of hot water supplies the passage 15 from the exterior of the cartridge, typically in normal supply conditions of the cartridge: this effect of a maximum supply of hot water inlet E2 is guaranteed for the entire range of regulation by the slide valve 2 when the groove 25 is dimensioned in such a way that its free volume V is at least equal, and even greater than the maximum volume of hot water that the inlet E2 can admit while the cold water inlet E1 is entirely closed off. Such a dimensioning of the volume V of the groove 25 is in particular carried out by the values of d and D specified hereinabove.

All of the preceding considerations in liaison with the groove for channeling hot water 25 can be transposed to the groove for channeling cold water 26. In other words, the cold water arriving in the passage 16 fills the free volume of the groove 26, by spreading out all around the slide valve 2, in such a way as to distribute the supply of cold water inlet E1 over the entire outside periphery of the slide valve, as indicated by the arrows F1, F2 and F3, respectively similar to the arrows C1, C2 and C3 for hot water.

Moreover, as mentioned hereinabove, during displacements along the axis X-X of the slide valve 2 in relation to the casing 1, the running part 27, which separates in a sealed manner the grooves 25 and 26, guides the displacements of the slide valve by adjusted sliding inside the case 12. Advantageously, in order to reinforce this guiding in displacement of the slide valve 2, in particular in the vicinity of the opposite axial surfaces 2A and 2B of the slide valve, the grooves 25 and 26 are respectively provided with protruding pins 28. These pins are distributed in a substantially uniform manner according to the outside periphery of the slide valve 2, without as such inducing significant limitations for the hot water or the cold water circulating in the grooves 25 and 26, between these pins 28. In order for the pins 28 to effectively provide a continuation in the outside guiding of the displacements of the slide valve 2, it is understood that each one of them extends protruding from the opening of the grooves 25 and 26 over the lateral outer surface 2C of the slide valve 2, as can be seen easily in FIG. 2. In this way, the free radial end of each of the pins 28 is able to be pressed against the inner surface of the wall of the case 12, in particular in the case where, during its displacements in relation to the casing 1, the slide valve 2 tends to be inclined slightly in relation to the axis X-X.

Independent of the considerations detailed until now in liaison with the grooves 25 and 26, the slide valve 2 has specific arrangements concerning its flow passage 21, aiming to improve the quality and/or the rapidity of the thermostatic regulation, via homogenisation of the mixture of hot water and of cold water downstream of the slide valve 2, in other words before this mixture reaches the thermosensitive part 31.1 of the body 31 of the thermostatic element 3. To do this, as can be seen easily in FIG. 2, the surface 23A, radially opposite the portion of the external body 22, presented by the portion of the internal body 23 is, in its lower portion, shaped to force the flow of cold water, circulating in the flow passage 21, to be directed towards the hot water inlet E2, until sending this flow of cold water, exiting the passage 21, directly on the hot water inlet E2, as indicated by the arrows F4 in FIG. 2: on the one hand, as can be seen easily in FIG. 3, the aforementioned lower portion of the surface 23A constitutes a surface 23A.1 able to guide on the hot water inlet E2 the cold water circulating in the flow passage 21, with this guiding surface running over the entire periphery of the portion of the internal body 23, except at the peripheral levels of the arms 24, and, on the other hand, as can be seen easily in FIG. 2, in order to, among other things, not create any resistance for the flow of cold water when it is guided by the surface 23A.1, the surface 22A of the portion of external body 22, delimiting the flow passage 21, includes a surface 22A.1 radially opposite the guiding surface 23A.1, this surface 22A.1 having, as an axial cross-section, substantially the same profile as the guiding surface 23A.1. In this way, the flow passage 21 has, in its lower portion that forces the flow of cold water to be directed towards the hot water inlet, a section of passage that is substantially constant according to the direction of the flow of the cold water. It is understood that, immediately downstream of the hot water inlet E2, the cold water, exiting the flow passage 21 and directed by the lower portion of the surface 23A of the portion of the internal body 23, transversally breaks the flow of hot water, the mixture between the hot water and the cold water then having turbulence thanks to which the temperature of the mixture is rapidly made even.

In the example embodiment considered in the figures, the guiding surface 23A.1 exits onto the lower axial surface 2A of the slide valve 2.

Also in the example embodiment considered in the figures, the guiding surface 23A.1 has, as an axial cross-section, a concave profile which is substantially constant over the entire periphery of the portion of internal body 23. Advantageously, on the lower end of this concave profile, the geometric straight line tangent to this concave profile is inclined by an angle, denoted as α in FIG. 2, in relation to the axis X-X, with this angle α being between 30 and 60°: in this way, the cold water exiting the flow passage 21 is directed on the hot water inlet E2, with an additional angulation, between 60 and 30°, in relation to the plane of the seat 17.

Also advantageously, the curvature of the concave profile of the guiding surface 23A.1 is designed progressively increasing according to the direction of the flow of the cold water in the flow passage 21: in this way, via the ramp effect, the cold water exiting the passage 21 is accelerated.

Advantageously, for reasons linked in particular to the constraints of demoulding the slide valve 2, note that the upper portion of the surface 23A of the portion of internal body 23 extends upwards the guiding surface 23A.1, not following the same profile as this guiding surface, but with a rectilinear profile that is substantially parallel to the axis X-X. This amounts to saying that the guiding surface 23A.1 is connected to the upper axial surface 2B of the slide valve 2 by a substantially cylindrical surface 23A.2, centred on the axis X-X, which constitutes the upper portion of the surface 23A of the portion of internal body 23.

Of course, the invention is not limited to the form of embodiment described hereinabove and shown, as various alternatives and options can be considered without leaving the scope of this invention.

What is claimed is:

1. A thermostatic cartridge for regulating hot and cold fluids to be mixed, the thermostatic cartridge comprising:
a casing, which is hollow, which defines an axis and which delimits an outlet for a mixture of the hot and cold fluids,
a slide valve for regulating a temperature of the mixture, which:
has two opposite axial surfaces,
interiorly delimits a flow passage which connects the axial surfaces together and through which a first fluid of the hot and cold fluids joins a second fluid of the hot and cold fluids in a direction of the outlet in order to form the mixture, and
can be displaced substantially along the axis in relation to the casing in such a way as to vary inversely the respective flow sections of a first fluid inlet for the first fluid, delimited axially between the casing and a first of the axial surfaces, and of a second fluid inlet for the second fluid, delimited axially between the casing and a second axial surface, of the axial surfaces, and
a thermostatic element, which comprises a piston, connected to the casing, and a body secured to the slide valve, the piston and the body being mobile in relation to one another substantially according to the axis under an action of an expanding of a heat expandable material contained in the body along a thermosensitive part from which flows the mixture downstream of the slide valve,
wherein the flow passage is adapted to direct the first fluid on the second fluid inlet, being at least partially delimited, by both a guiding surface for guiding the first fluid on the second fluid inlet, which runs over most of an inside periphery of the slide valve, and by an opposed surface which is radially opposite the guiding surface and which has, in an axial cross-section, substantially the same profile as the guiding surface.

2. The thermostatic cartridge according to claim 1, wherein the guiding surface exits on the second axial surface of the slide valve.

3. The thermostatic cartridge according to claim 1, wherein the guiding surface is connected to the first axial surface of the slide valve by a cylindrical surface centred on the axis.

4. The thermostatic cartridge according to claim 1, wherein the guiding surface has, in an axial cross-section, a concave profile which is substantially constant over an entire inside periphery of the slide valve.

5. The thermostatic cartridge according to claim 4, wherein, at an end of the concave profile, turned towards the second axial surface of the slide valve, a straight line tangent to the concave profile is inclined between 30 and 60° in relation to the axis.

6. The thermostatic cartridge according to claim 4, wherein the concave profile has a curvature that progressively increases according to the direction of flow of the first fluid in the flow passage.

7. The thermostatic cartridge according to claim 1, wherein the slide valve comprises generally annular body parts, respectively external and internal, which are centred on the axis, which are fixedly connected together, and which radially delimit the flow passage between them, wherein the internal body part has, opposite the external body part, a face including the guiding surface, and wherein the external body part has, opposite the internal body part, a face including the opposed surface.

8. The thermostatic cartridge according to claim 7, wherein the internal and external body parts are integral with arms connecting radially the internal and external body parts.

9. The thermostatic cartridge according to claim 1, wherein the slide valve exteriorly delimits a groove for channeling the first fluid, which is adapted to distribute the first fluid supplying the first fluid inlet over the entire outside periphery of the slide valve.

10. The thermostatic cartridge according to claim 1, wherein the slide valve exteriorly delimits a groove for channeling the second fluid, which is adapted to distribute the second fluid supplying the second fluid inlet over the entire outside periphery of the slide valve.

* * * * *